United States Patent [19]

Mruk

[11] 3,928,430
[45] Dec. 23, 1975

[54] METHOD FOR THE PREPARATION OF 3,3-METHYLENEBIS (BENZOIC ACID)

[75] Inventor: Norbert J. Mruk, Pittsburgh, Pa.

[73] Assignee: Koppers Company, Inc., Pittsburgh, Pa.

[22] Filed: July 19, 1974

[21] Appl. No.: 490,207

[52] U.S. Cl. .............................. 260/515 P; 260/515
[51] Int. Cl.² ........................................ C07C 63/33
[58] Field of Search ............................. 260/515 P

[56] References Cited
UNITED STATES PATENTS

| | | | |
|---|---|---|---|
| 3,257,452 | 6/1966 | Le Blanc et al. | 260/515 |
| 3,705,786 | 12/1972 | Kaye | 21/2.7 |

FOREIGN PATENTS OR APPLICATIONS

| | | | |
|---|---|---|---|
| 40-13869 | 7/1965 | Japan | 260/515 P |

*Primary Examiner*—James A. Patten
*Attorney, Agent, or Firm*—Robert D. Yeager

[57] ABSTRACT

A method for the preparation of 3,3'-methylenebis (benzoic acid) which comprises reacting a mixture of benzoic acid and formaldehyde in the presence of dilute sulfuric acid at a temperature between 70° and 120°C. and preferably as a heterogeneous mixture. The heterogeneous reaction mixture comprising two solid components and an acid phase is filtered to provide the reaction product methylenebis (benzoic acid) and unreacted benzoic acid and the acidic filtrate. The acidic filtrate is recycled to the reaction vessel for use in a subsequent reaction. Water at temperatures between 60° and 100°C. is added to the mixture of methylenebis (benzoic acid) and benzoic acid to form an aqueous solution of benzoic acid and undissolved 3,3'-methylenebis (benzoic acid). The aqueous solution is filtered to provide 3,3'-methylenebis (benzoic acid). The aqueous filtrate is cooled and the benzoic acid which precipitates is filtered and recycled to the reaction vessel for use in a subsequent reaction, and the water is reused in subsequent extractions.

9 Claims, 2 Drawing Figures

MBBA RECYCLE SYSTEM 3,928,430

METHOD FOR THE PREPARATION OF 3,3-METHYLENEBIS (BENZOIC ACID)

FIELD OF THE INVENTION

The present invention relates to a new process adapted for the commercial preparation of methylenebis (benzoic acid), and, in particular, 3,3'-methylenebis (benzoic acid).

BACKGROUND OF THE INVENTION

Methylenebis (benzoic acid) has been known for many years. Methylenebis (benzoic acid) as prepared generally comprises a mixture of the dimer, trimer, and higher oligomers of benzoic acid and formaldehyde. It has been used as a monomer in the preparation of certain condensation polymers, such as aromatic polyamides and polybenzimidazoles. More recently, however, 3,3'-methylenebis (benzoic acid) has been found to be an effective corrosion inhibitor of ferrous metals in aqueous environments, see, for example, U.S. Pat. No. 3,705,789.

Methylenebis (benzoic acid) was originally prepared by Schopff, Ber. 27, 23–24 (1894), by the condensation reaction of benzoic acid and formaldehyde in concentrated sulfuric acid. In this method the reaction product is slowly poured into a large quantity of cold water, which disperses upon stirring and wherein a viscous mass precipitates. The viscous mass is then filtered and the filtered product is dissolved in ammonia. The diphenyl methane dicarboxylic acid, which is precipitated with an acid, is then continuously extracted by the use of large quantities of hot water. Methylenebis (benzoic acid) goes into solution and precipitates after the filtration of a residue. This method of preparation has been extensively used over the years and is the principal method for the preparation of small quantities of methylenebis (benzoic acid). This method, however, requires extensive dilution of the reaction mixture, and does not permit the reuse of sulfuric acid without concentration thereof by distillation of the dilution water.

Other methods for the preparation of methylenebis (benzoic acid) have been suggested. For example, Japanese Pat. No. 13869, where methyl benzoate is condensed with formaldehyde in 94% sulfuric acid to provide an esterified product which is thereafter saponified. It has also been proposed to utilize a two-step reaction process without the use of formaldehyde in the preparation of methylenebis (benzoic acid), for example, British Pat. No. 730,890. In this process, m-toluic acid is chlorinated in the first step of the reaction to provide the intermediate chloromethylbenzoic acid. This intermediate is then condensed with benzoic acid in the presence of a ferric chloride catalyst to provide methylenebis (benzoic acid).

While the prior art methods do provide for the preparation of methylenebis (benzoic acid), they do not lend themselves to the inexpensive preparation of commercial quantities thereof. The prior processes generally include tarry byproducts which require that the methylenebis (benzoic acid) be purified and the purification thereof is relatively expensive.

Accordingly, it is an object of the present invention to provide a process for the preparation of methylenebis (benzoic acid) [MBBA] which is free of tarry byproducts, possesses a light color, and has a higher melting point than products previously obtained by prior art processes. In general, it is an object of the present invention to provide a method for obtaining a much higher quality MBBA which requires no extensive purification. It is a further object of the present invention to provide a process that requires little or no concentration of the sulfuric acid used in the reaction and which affords a continuous recycling of unreacted benzoic acid and sulfuric acid to provide high quality commercial quantities not obtainable heretofore.

SUMMARY OF THE INVENTION

The present invention provides a method for the commercial preparation of methylenebis (benzoic acid). Generally, the method comprises reacting benzoic acid and formaldehyde, preferably as paraformaldehyde, in the presence of dilute sulfuric acid at a temperature preferably between 60° to 80°C. to provide a heterogeneous reaction mixture. Temperatures in excess of 80°C. can be utilized, for example, from 80°C. to about 120°C., but the higher temperatures result in a homogeneous reaction mixture requiring that the mixture be cooled to the preferred temperature in order to provide a heterogeneous reaction mixture. The sulfuric acid used in the process of the present invention has a concentration of from about 70 to 90% by weight and, preferably, about 80% by weight.

The molar ratio of benzoic acid to formaldehyde may be varied within a relatively wide range, for example, from 4:1 to 1:1. The ratio of benzoic acid to formaldehyde is chosen to provide the desired optimization of the process. For example, a high molar ratio, 4:1, of benzoic acid: formaldehyde, will provide a lower conversion to methylenebis (benzoic acid) than a lower molar ratio, e.g. 1:1, but the resulting methylenebis (benzoic acid) will have a higher content of dimeric structure. The utilization of a lower molar ratio, e.g., 1:1, on the other hand, will provide a higher conversion to methylenebis (benzoic acid) containing larger amounts of trimeric and other oligomeric structures. It is, therefore, preferable to utilize a molar ratio of about 2:1 benzoic acid to formaldehyde, preferably paraformaldehyde. The preferred ratio of 2:1 provides a suitable yield of methylenebis (benzoic acid) which has a high dimeric content.

The reaction times vary according to the temperature of the reaction mixture, the concentration of the sulfuric acid and the desired conversion rates. For example, at the preferred operating conditions, i.e., a temperature of 80°C., a 2:1 molar ratio of benzoic acid to paraformaldehyde, and 80% by weight sulfuric acid, a reaction time of 4 hours provides a 53% conversion to methylenebis (benzoic acid). At 80°C., however, a 60% conversion is provided after a reaction time of 10 hours, and at 70°C., 2 hours, a conversion rate of 21.6% is provided. Accordingly, the reaction times are optional and depend upon the selected operation parameters of the process.

The process of the present invention includes a method for removing the methylenebis (benzoic acid) formed in the reaction of benzoic acid and formaldehyde, and for the reuse or recycling of both sulfuric acid and unreacted benzoic acid. The process therefore provides the capability of reusing the unreacted starting material and sulfuric acid without purification or distillation being required. Accordingly, the process of the present invention is capable of being operated as a "continuous batch" operation with little or no waste disposal problems.

In preferred practice of the present invention, the heterogeneous reaction mixture comprises sulfuric acid and a two-component solid reaction product consisting substantially of methylenebis (benzoic acid) and unreacted benzoic acid. The sulfuric acid includes minor amounts of dissolved benzoic and methylenebis (benzoic acid). The reaction mixture is filtered and the acidic filtrate is used in the subsequent condensation reaction. The solid reaction products are extracted with water at a temperature of between about 70° and 100°C. and filtered to provide solid 3,3′-methylenebis (benzoic acid) product and an aqueous solution of benzoic acid. The aqueous benzoic acid solution is permitted to cool to a temperature preferably below 80°C. The cooled solution is filtered to recover water, which is reused, and crystallized benzoic acid which is also reused in a subsequent condensation reaction.

Other advantages of the present invention are apparent from the following detailed description of the invention and examples taken in connection with the accompanying drawings.

DETAILED DESCRIPTION OF THE INVENTION

Figure 1:
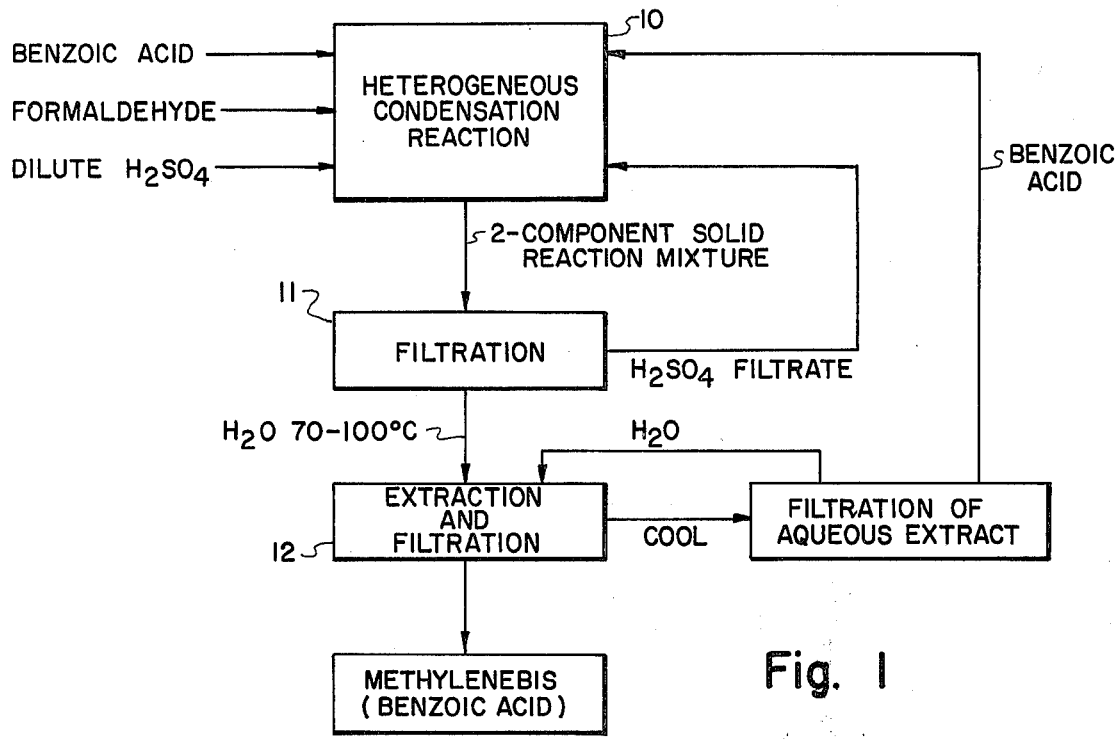
FIG. 1 is a flow diagram of the preparation of 3,3′-methylenebis (benzoic acid) in accordance with the present invention.

With reference to FIG. 1, a practical embodiment of the process provides a reaction vessel 10 into which benzoic acid and paraformaldehyde are charged in the presence of dilute sulfuric acid. Reaction vessel 10 is maintained at a temperature of about 80°C. for a period of about 4 hours to provide a heterogeneous condensation reaction mixture. Because of the heterogeneity of the mixture, a two-component solid product is discharged from reaction vessel 10 through filtering means 11 where the solid product, which includes methylenebis (benzoic acid) and unreacted benzoic acid, is separated from the sulfuric acid. The sulfuric acid filtrate is recycled to reaction chamber 10 for use in a subsequent reaction.

Since the dilute sulfuric acid that is recycled eventually darkens in color due to the impurities present therein as well as becomes further diluted because of the formation of small amounts of water in the reaction, the acid can be periodically concentrated and clarified by suitable treatment such as activated carbon. The solid product recovered by filtration can be, if desired, washed at this point with water. However, this is an optional step.

The solid product is then extracted in extractor 12 with hot water at a temperature sufficient to dissolve substantially all of the unreacted benzoic acid present. Filtration of the hot extract yields methylenebis (benzoic acid) and an aqueous solution of benzoic acid. The aqueous extract is cooled to permit the precipitation of benzoic acid therefrom and filtered. The recovered benzoic acid is recycled to reactor 10 for use in a subsequent reaction.

It is clear, therefrom, that a number of passes or recycles provides commercial quantities of 3,3′-methylenebis (benzoic acid) with little or no waste by-product. A single-pass yield of 53% can be achieved within the preferred operating parameters.

The following nonlimiting examples are set forth as illustrative of the method of the present invention.

EXAMPLE 1

50.0 g. of benzoic acid and 6.15 g. of paraformaldehyde were charged into a reaction chamber containing 1,250 ml. of 80% by weight $H_2SO_4$; i.e., a 2:1 molar ratio of benzoic acid to paraformaldehyde, and 3.84% concentration of benzoic acid to $H_2SO_4$ was utilized. The reaction was run at 90°C. for a period of 2 hours. Because of the high temperature, a homogeneous reaction was achieved requiring that reaction mixture to be cooled to provide a heterogeneous mixture. The heterogeneous mixture was filtered to provide a 46% yield of the two-component solid reaction mixture. The solid reaction product comprised 77% methylenebis (benzoic acid) and 23% unreacted benzoic acid.

EXAMPLE 2

In this example, a 250 ml. of the acidic filtrate from Example 1 was used to which was charged 10.0 g. of benzoic acid and 1.23 g. of paraformaldehyde (2:1 benzoic acid and 1.23 g. of paraformaldehyde (2:1 molar ratio, 3.8% benzoic acid/$H_2SO_4$). A homogeneous reaction was run at 90°C. for a period of 2 hours. The reaction mixture was cooled to provide a heterogeneous mixture which was filtered to provide 49% yield of 2-component solid reaction product. That reaction product comprised 86% methylenebis (benzoic acid) and 15% unreacted benzoic acid.

EXAMPLES 3–6

In Examples 3–6, 32.4 g. benzoic acid and 3.99 g. paraformaldehyde were charged into a reaction vessel containing 100 ml. of 80% by weight $H_2SO_4$. Each example was run at a different temperature for a different length of time. The results of these examples are summarized in Table I below.

TABLE I

| Ex. | Temp. (°C) | Time (hr.) | BA (g.) | MBBA[1] (g.) | MBBA[2] % Yield |
|---|---|---|---|---|---|
| 3 | 26 | 120 | 26.2 | 0 | 0 |
| 4 | 70 | 2 | 17.1 | 7.3 | 21.6 |
| 5 | 120 | 1.75 | 12.9 | 14.0 | 41.1 |
| 6 | 80 | 10 | 11.7 | 16.8 | 49.6 |

[1]The MBBA product is a mixture of the dimer, trimer and higher oligomers. All of the above products found to be useful as corrosion inhibitors.
[2]The maximum theoretical yield of MBBA is 34.0 g. based on the BA charged.

EXAMPLE 7

Figure 2:
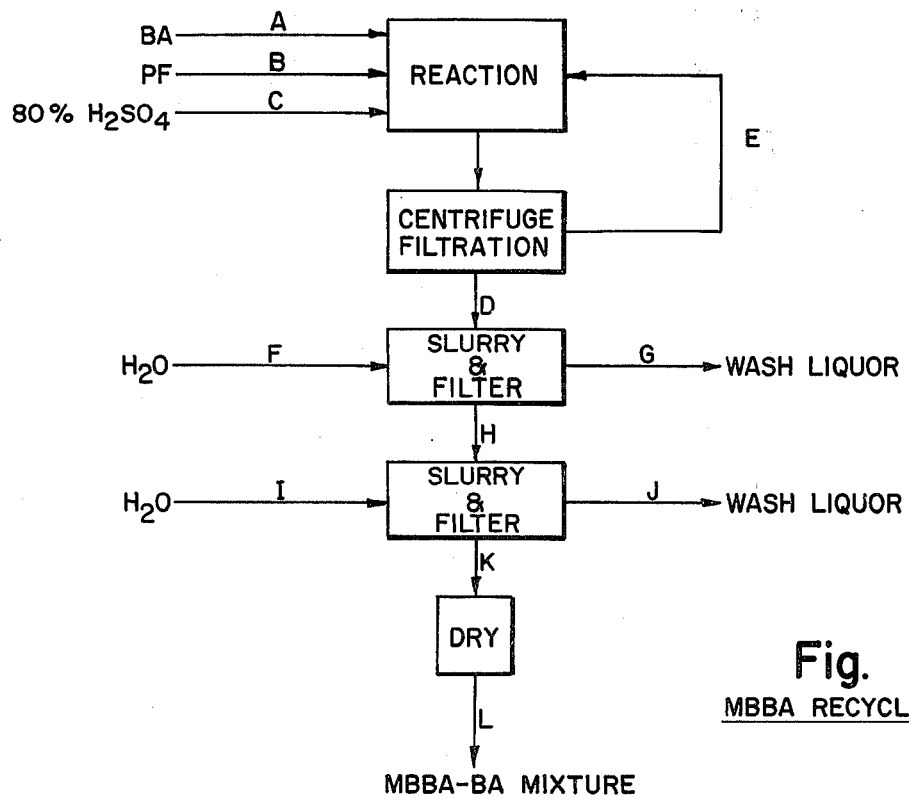
FIG. 2 is a flow diagram for the recycling of unreacted paraformaldehyde, and sulfuric acid in accordance with Example 7.

With reference to FIG. 2, a total of five recycle runs were performed utilizing the following procedure. The complete material balance is set forth in TABLE II and TABLE III where the reference letters correspond with like reference letters in FIG. 2. After each cycle, the values of material streams A, B and C were calculated for the next cycle from the values set forth in TABLE II and TABLE III.

Procedure:

30.5 g. (0.250 mole) benzoic acid, A, 3.75 g. (0.125 mole) paraformaldehyde, B, and 163.0 g. (94 ml.) 80% sulfuric acid, C., were charged into a 250 ml., three neck, round bottom flask fitted with a mechanical stirrer, condenser, and thermometer. Heat was supplied by means of a heating mantle controlled by a Therm-O-Cap relay. The reaction mixture was stirred at 80°C. for 4 hours. After cooling to room temperature, the reaction mixture was filtered through a basket centrifuge filter using glass cloth as the filtration medium. The filtrate was analyzed for formaldehyde content by G. C. analysis and recycled to Run No. 2 while the solid was washed twice by slurrying with water and suction filtering through a fritted glass funnel after each wash. The solid product was then dried and analyzed for benzoic acid content by infrared analysis.

TABLE II

MATERIAL VALUES (IN GRAMS) RELATED TO EXAMPLE 7 (FIG. 2)

| Material Stream | Run No. 1 | 2 | 3 | 4 | 5 |
|---|---|---|---|---|---|
| A | 30.5 | 30.0 | 30.5 | 26.2 | 25.0 |
| B | 3.75 | 3.72 | 3.67 | 3.56 | 3.56 |
| C | 163.0 | 63.2 | 74.0 | 44.5 | 35.9 |
| D | 83.0 | 94.1 | 62.7 | 55.6 | 55.3 |
| E | 100.8 | 90.0 | 123.8 | 133.6 | 133.0 |
| % CH$_2$O Stream E | 0.25 | 0.33 | 0.33 | 0.32 | 0.95 |
| F | 125.0 | 125.0 | 125.0 | 125.0 | 125.0 |
| G | 126.8 | 130.8 | 118.7 | 120.4 | 122.1 |
| H | 71.8 | 79.6 | 59.9 | 54.3 | 47.4 |
| I | 125.0 | 125.0 | 125.0 | 125.0 | 125.0 |
| J | 132.9 | 138.6 | 133.1 | 128.4 | 129.2 |
| K | 62.9 | 65.2 | 50.9 | 49.8 | 42.4 |
| L | 26.8 | 31.2 | 26.3 | 23.7 | 21.6 |
| % BA in Product L | 36.8 | 35.6 | 63.7 | 62.4 | 58.8 |

TABLE III

MATERIAL LOSSES (IN GRAMS) RELATED TO EXAMPLE 7

| Location of material loss | Run No. 1 | 2 | 3 | 4 | 5 |
|---|---|---|---|---|---|
| Reaction flask | 7.0 | 9.5 | 7.4 | 6.0 | 5.5 |
| Walls of centrifuge | 5.1 | 4.2 | 2.6 | 1.8 | 2.1 |
| Glass filter cloth | 4.0 | 3.8 | 5.4 | 3.1 | 7.8 |
| Centifuge basket | 2.9 | 1.3 | 1.3 | 1.6 | 1.2 |
| Glass fritted funnel | 2.7 | 2.3 | 2.2 | 2.6 | 2.4 |
| Unaccountable losses | 5.9 | 3.3 | 4.0 | 2.4 | 3.8 |

While presently preferred embodiments of the invention have been shown and described in particularity, it may be otherwise embodied within the scope of the appended claims.

What is claimed is:

1. A method for the preparation of 3,3'-methylenebis (benzoic acid), said method comprising:
    A. reacting benzoic acid and formaldehyde in the presence of dilute sulfuric acid at a temperature of from about 60° to 120°C. to prepare a heterogeneous reaction mixture, said reaction mixture comprising first and second solid components of methylenebis (benzoic acid) and benzoic acid, respectively, and an acid phase;
    B. filtering said heterogeneous reaction mixture to obtain said first and second solid component products;
    C. adding water at a temperature of between 70° and 100°C. to said solid products to form an aqueous solution of said second component; and
    D. filtering said aqueous solution and recovering said first component solid.

2. A method as set forth in claim 1 wherein the concentration of said sulfuric acid is between 70% and 90% by weight.

3. A method as set forth in claim 1 wherein said benzoic acid and formaldehyde are reacted in molar ratios of between 4:1 to 1:1.

4. A method as set forth in claim 3 wherein said molar ratio is 2:1.

5. A method as set forth in claim 1 wherein said acidic filtrate is recycled for reuse in a subsequent reaction.

6. A method as set forth in claim 5 wherein said filtered aqueous extract is cooled to precipitate said second component solid and wherein said precipitated solid is filtered and recycled for use in a subsequent reaction.

7. A method as set forth in claim 6 wherein the water from said filtered aqueous solution is used to form in a subsequent reaction an aqueous solution of said second component solid.

8. A method for the preparation of 3,3'-methylenebis (benzoic acid), said method comprising:
    A. reacting benzoic acid and formaldehyde in a molar ratio of from 4:1 to 1:1 in the presence of sulfuric acid having a concentration of between 70 and 90% at a temperature between about 60° and 120°C. to prepare a heterogeneous reaction mixture, said reaction mixture comprising first and second solid components of methylenebis (benzoic acid) and benzoic acid, respectively, and an acid phase;
    B. filtering said heterogeneous reaction mixture to obtain said first and second solid component products;
    C. adding water at a temperature of between 70° and 100°C. to said solid products to form an aqueous solution of said second component solid; and
    D. filtering said aqueous solution to recover said first component solid.

9. A method as set forth in claim 8 wherein said benzoic acid and paraformaldehyde are reacted at temperature above about 90°C. to form a homogeneous reaction mixture, said method comprising the additional step of cooling said reaction mixture to obtain said heterogeneous reaction mixture.

* * * * *

UNITED STATES PATENT OFFICE
CERTIFICATE OF CORRECTION

PATENT NO. : 3,928,430
DATED : December 23, 1975
INVENTOR(S) : Norbert J. Mruk

It is certified that error appears in the above—identified patent and that said Letters Patent are hereby corrected as shown below:

Column 5, In Table II, Under the Columns Material Stream H, Run No. 5, "47.4" should read --47.7--

Signed and Sealed this sixth Day of April 1976

[SEAL]

Attest:

RUTH C. MASON
Attesting Officer

C. MARSHALL DANN
Commissioner of Patents and Trademarks